(12) United States Patent
Messié et al.

(10) Patent No.: US 11,902,270 B2
(45) Date of Patent: Feb. 13, 2024

(54) METHOD FOR PREPARING USAGE DATA FOR RELAYS USED DURING A COMMUNICATION BETWEEN TWO DEVICES AND FOR SEARCHING FOR THE DATA AND ASSOCIATED DEVICES

(71) Applicant: Orange, Issy-les-Moulineaux (FR)

(72) Inventors: Vincent Messié, Chatillon (FR); Gaël Fromentoux, Chatillon (FR); Nathalie Omnes, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 231 days.

(21) Appl. No.: 17/044,738

(22) PCT Filed: Apr. 10, 2019

(86) PCT No.: PCT/FR2019/050844
§ 371 (c)(1),
(2) Date: Oct. 1, 2020

(87) PCT Pub. No.: WO2019/207231
PCT Pub. Date: Oct. 31, 2019

(65) Prior Publication Data
US 2021/0092110 A1 Mar. 25, 2021

(30) Foreign Application Priority Data

Apr. 23, 2018 (FR) ...................................... 1853531

(51) Int. Cl.
*H04L 29/06* (2006.01)
*H04L 9/40* (2022.01)
(Continued)

(52) U.S. Cl.
CPC ........ *H04L 63/0823* (2013.01); *H04L 9/3247* (2013.01); *H04L 9/3263* (2013.01); *H04L 43/0876* (2013.01); *H04L 63/126* (2013.01)

(58) Field of Classification Search
CPC . H04L 63/0823; H04L 9/3247; H04L 9/3263; H04L 43/0876; H04L 63/126
See application file for complete search history.

(56) References Cited

U.S. PATENT DOCUMENTS

| 11,057,352 B2* | 7/2021 | Guberman | ............ H04W 12/04 |
| 2012/0166582 A1* | 6/2012 | Binder | .................. G06F 21/602 709/217 |

(Continued)

OTHER PUBLICATIONS

International Search Report dated Jul. 19, 2019, issued in Patent Cooperation Treaty Application No. PCT/FR2019/050844.

*Primary Examiner* — Jeffrey C Pwu
*Assistant Examiner* — Mayasa A. Shaawat
(74) *Attorney, Agent, or Firm* — Knobbe, Martens, Olson & Bear, LLP

(57) ABSTRACT

A method for preparing usage data for a relay implemented in a computer network is disclosed. In one aspect, the network comprises at least one source device, one destination device, and at least one relay constituting a circuit to set up a communication between the source device and the destination device. The source device first of all retrieves the identifiers of the relays constituting the circuit and sends a proof of use (PoU) frame addressed to the destination device, each relay of the circuit adding to the PoU frame, at the time of passage, a signature made from a challenge and a key proper to the relay. The source device retrieves at least the signatures of each relay, and verifies the signatures received by using the public keys of the relays, the authentication of the signatures triggering the following steps: preparing, from the data received, an ordered list of identifiers of the relays used to set up the communication, sending transaction frames addressed to each relay identified in the list to generate proofs of use comprising at least the signatures contained in the PoU frame, the transaction frames (Continued)

being designed to trigger the sending by each relay of a proof of use recorded in a shared memory.

17 Claims, 8 Drawing Sheets

(51) Int. Cl.
    *H04L 9/32*     (2006.01)
    *H04L 43/0876*     (2022.01)

(56) References Cited

U.S. PATENT DOCUMENTS

| | | | | |
|---|---|---|---|---|
| 2015/0244448 | A1* | 8/2015 | Seok | H04W 48/12 |
| | | | | 370/315 |
| 2018/0013570 | A1* | 1/2018 | Knopf | H04L 63/123 |
| 2019/0349426 | A1* | 11/2019 | Smith | H04W 12/69 |

* cited by examiner

METHOD FOR PREPARING USAGE DATA FOR RELAYS USED DURING A COMMUNICATION BETWEEN TWO DEVICES AND FOR SEARCHING FOR THE DATA AND ASSOCIATED DEVICES

CROSS-REFERENCE TO RELATED APPLICATIONS

This application is filed under 35 U.S.C. § 371 as the U.S. National Phase of Application No. PCT/FR2019/050844 entitled "METHOD FOR FORMULATING USAGE DATA IN RESPECT OF REPLAYS USED IN THE COURSE OF A COMMUNICATION BETWEEN TWO DEVICES, FOR SEARCHING SAID DATA, AND ASSOCIATED DEVICES" and filed Apr. 10, 2019, and which claims priority to FR 1853531 filed in France on Apr. 23, 2018, each of which is incorporated by reference in its entirety.

BACKGROUND

Technical Field

The field of the invention is that of communications networks and more particularly networks having relays used to route messages between a source device and a destination or recipient device.

More specifically, the present invention makes it possible to determine the quantity of data traffic passing through these relays during communications and to produce proofs of use of these relays.

The present invention finds application especially in the fields of optimization of network architectures and of invoicing for services.

Description of the Related Technology

Computer networks enable communications among several interlocutors. Certain networks additionally ensure the anonymity of the communications. Among these, we can cite the TOR network (also known as the "Darknet"), the protocol of which comprises several levels of encryption and decryption, through different relays. These relays provide for information exchange and, at the same time, mask the source of the data, thus ensuring the anonymity of the communications.

Depending on the communications routing requirements, certain relays of the network can be occupied or busy to a greater or lesser extent. In order to obtain the utmost densification of the networks while at the same time optimizing the position of the relays, it is important to know the level of occupancy of these devices so as to verify, at all points, that the devices are properly available. This availability can be assessed especially by estimating the bandwidth. To this end, a request for proof of connectivity is sent by means of a specific data packet exchanged within a circuit at a frequency that is determined at the time of creation of the communications circuit, generating an exchange of cryptographic primitives between the different relays. This consensus mechanism provides "proof of bandwidth" or PoB.

This PoB mechanism, as defined in the Torcoin standard, relies on the use of the TOR network. In this network, the creation of the circuits is achieved by a consensus group, namely the assignment servers. These trusted third parties have the role of creating TOR circuits by shuffling all the customers and the relays, considerably increasing the robustness of the system against the presence of malicious relays. Through this mechanism, if half of the nodes are corrupted, one-sixteenth of the circuits are corrupted. The production of PoB according to the Torcoin standard makes it possible to determine the rate of use of a relay by evaluating the bandwidth (i.e. the bitrate) provided by the relay that is used by the customers and thus defining its utility in the network with precision, so as to thus reward it as a function of this utility. If it turns out that little bandwidth travels through a relay, then its existence in the network can be called into question. This evaluation is done by means of cryptographic primitives (which especially ensure authenticity and anonymity) and regularly exchanged proofs of bandwidth. Since the frequency of these frames is known, this tool makes it possible to plot the use of a circuit with precision.

This solution ensures anonymity but does not make it possible to determine the quantity of traffic that has flowed through these relays because that would require them to make themselves known, and this would be contrary to the founding principle of this network. In addition, in the case of PoB, the consensus mechanism gives rise to major constraints to prevent fraud by necessitating the presence of a trusted third party represented by the "assignment servers".

There is therefore a real need for a novel counting solution certified by both extremities, based on a DLT (Blockchain—Distributed Ledger Technology) based on a proof enabling the use of relays to be measured. This system is particularly suited to the densification of the access networks and the improvement of their capillarity.

There is therefore a need for a novel solution for measuring the use of relays in a communications circuit that does not have these drawbacks of the prior art.

SUMMARY OF CERTAIN INVENTIVE ASPECTS

It is an object of the present invention to propose a solution to compute the quantity of data and/or the number of communications set up between the two devices at the extremities of a connection.

To this end, the invention proposes a method for preparing usage data for a relay implemented in a computer network comprising at least one source device, one destination (or recipient) device and at least one relay constituting a circuit to set up a communication between the source device and the destination device. The method comprises the following steps implemented in the source device:

retrieving identifiers of the relays constituting said circuit,
sending a frame called a "PoU" frame addressed to the destination device, each relay of the circuit adding to the PoU frame, at the time of passage, a signature made from a challenge and a key proper to said relay,
retrieving, in return of said PoU frame, at least the signatures of each relay,
verifying the signatures received by using the public keys of the relays of said circuit, the authentication of the signatures triggering the following steps:
preparing, from the data received, an ordered list of identifiers of the relays used to set up said communication,
sending transaction frames addressed to each relay identified in said list to generate proofs of use comprising at least the signatures contained in the PoU frame, the transaction frames being designed to trigger the sending by each relay of a proof of use recorded in a shared memory.

In this way, and depending on the communications routing requirements, certain relays of the network can be busy to a greater or lesser extent. In order to achieve the utmost densification of the networks, in optimizing the position of the relays, it is important to know the level of occupancy of these devices in order to ensure that the devices are properly available everywhere. The availability can be evaluated especially by computing the quantity of data and/or the number of communications set up between the two devices at the extremities of a connection.

According to one particular embodiment, subsequently to the retrieval of the identifiers of the relays, the source device compares the identifiers received with the content of a blacklist of devices, the presence of a relay identifier in said blacklist stopping the communication between the source device and the destination device and triggering a new step for determining a circuit that does not pass through the identified relay.

According to one particular embodiment, the PoU frame is sent by the source device at regular time intervals. In this way, the proofs of use are generated regularly, thus making it possible to evaluate the effective work of each relay.

According to one particular embodiment, the PoU frame is sent by the source device whenever the quantity of data exchanged with the destination device since the last sending of the PoU frame exceeds a determined quantity of data. In this way, the proofs of use are generated whenever a certain quantity of data is transmitted, thus making it possible to evaluate the effective work of each relay.

According to one particular embodiment, the PoU frame sent by the source device comprises the value of the challenge used by the relays to compute the signatures by means of their secret keys. In this way, the proofs of use are customized with an element belonging to the device that is the source of the communications.

The invention also proposes a method for recording usage data for a relay implemented in a computer network comprising at least one source device, one destination device and at least one relay constituting a circuit to set up a communication between the source device and the destination device. The method comprises especially the following steps implemented in a relay:
  sending the identifier of the relay to the source device,
  receiving a frame called a "PoU" coming from the source device or from the preceding relay within the circuit,
  computing a signature from a challenge and from a key proper to said relay,
  adding at least this signature to the PoU frame and transmitting the PoU frame to the destination device or to the relay present in the circuit in the direction of the destination device, depending on the position of the relay in said circuit,
  receiving at least one transaction frame coming from the source device or the destination device, the transaction frame comprising at least the signatures of the relays contained in the PoU frame,
  sending, following the reception of each transaction frame, a request for recording, in a shared memory, a proof of use of this relay comprising at least the signatures of the relays of the circuit.

According to one particular embodiment, the method comprises a step of reception of a frame called a "PoU return" frame coming from the destination device and containing at least the set of identifiers of the PoU frame received, a step of transmission of said received frame to the source device and a subsequent step of reception from the source device of a transaction frame triggering the generation of a proof of use of the relay.

In this way, the recording of proofs of use can be triggered by the device that is the source of the communication and by the device that is the destination of this communication.

According to one particular embodiment, the relay receives, from the shared memory, a return message indicating that the recording has been properly done, an absence of the return message for a determined duration after the sending triggering the elimination of the communications circuit.

In this way, the relay is assured that the proof of use is truly recorded.

According to one particular embodiment, the identifiers of the relays comprise a public key value characteristic of each relay.

According to one particular embodiment, the relay provides a certificate produced from the secret key associated with its public key, said certificate being added to the PoU frame, the relay verifying the certificate sent by a relay by means of a cryptographic computation bringing said public key into action.

According to one particular embodiment, the certificate associated with a relay is generated from a random number. In this way, the security of the proof of use is reinforced.

According to one particular embodiment, the PoU frame received comprises the value of the challenge used by the relay to compute the signature by means of the secret key of the relay. In this way, the proofs of use are customized with an element belonging to the device that is the source of the communications.

The invention also proposes a method for preparing usage data for a relay implemented in a computer network comprising at least one source device, one destination device and at least one relay constituting a circuit to set up a communication between the source device and the destination device, comprising the following steps implemented in the destination device:
  receiving the identifier of at least one relay present in the circuit,
  receiving a frame called a "PoU" frame coming from the source device and containing at least one signature made by a relay from a challenge and a key proper to said relay,
  verifying received signatures by using the public keys of the relays of said circuit, the authentication of the signatures triggering the following steps:
    preparing, from the data received, an ordered list of identifiers of relays used to set up said communication,
    sending transaction frames addressed to each relay identified in said list to generate proofs of use of these relays comprising at least the signatures contained in the PoU frame, the transaction frames being designed to trigger the sending by each relay of a proof of use recorded in a shared memory.

According to one particular embodiment, the method further comprises a step for preparing a data frame called a "PoU return frame" comprising the certificates and the identifiers of at least all the relays of the circuit, and a step for sending said PoU return frame to the source device with the signature made by means of a key of the destination device.

The invention also proposes a source device intended to enter into communication with a destination device through a circuit comprising at least one relay and belonging to a computer network comprising a shared memory, said device comprising a communications means retrieving the identifiers of the relays constituting said circuit and sending a first frame called a "PoU frame" addressed to the destination device, said frame being intended to retrieve, on passage through each relay, a signature made from a challenge and a key proper to said relay, a means for verifying the signatures retrieved in using the public keys of the relays of said circuit, the authentication of the signatures by the means for verifying triggering the sending by the communications means of transaction frames addressed to each relay identified in said circuit, said transaction frames comprising at least the signatures contained in the PoU frame and triggering, during their reception by each relay, the sending of a request for recording a proof of use to a shared memory.

The invention also proposes a relay device intended to set up a communication between a source device and a destination device through a circuit comprising at least said relay and belonging to a computer network comprising a shared memory, said relay device comprising a communications means receiving, from the source device, a frame called a "PoU" frame and a means for computing a signature from a challenge and a key proper to said relay, said communications means sending, to the destination device or from the relay present in the circuit in the direction of the destination device, said PoU frame in adding thereto at least its computed signature, said communications means subsequently receiving, from the source device or the destination device, at least one transaction frame comprising at least the signatures of the relays contained in the PoU frame, said communications means sending, subsequently to the reception of each transaction frame, a request for recording, in a shared memory, a proof of use of this relay comprising at least the signatures of the relays of the circuit.

The invention also proposes a destination device intended to receive a communication from a source device through a circuit comprising at least one relay and belonging to a computer network comprising a shared memory, said destination device comprising a communications means receiving a frame called a "PoU" frame coming from the source device and containing at least one signature made from a challenge and a key proper to at least one relay of the circuit, a means for verifying signatures of the PoU frame in using the public keys of the relays of said circuit, the authentication of the signatures by the means for verifying triggering the sending by the communications means of transaction frames addressed to each relay identified in said circuit to generate proofs of use of these relays, the transaction frames comprising at least the signatures contained in the PoU frame being designed to trigger the sending by each relay of a proof of use recorded in a shared memory.

Another aspect relates to one or more computer programs comprising instructions to implement a method for preparing usage data for a relay as described here above when this program or these programs are executed by at least one processor.

According to yet another aspect, the invention proposes one or more non-transient recording media readable by a computer and comprising instructions of one or more computer programs comprising instructions for the implementing of a method for preparing usage data for a relay as described here above.

BRIEF DESCRIPTION OF THE DRAWINGS

Other features and advantages of the invention shall appear more clearly from the following description of one particular embodiment, given by way of a simple illustratory and non-exhaustive example, and from the appended figures of which.

DETAILED DESCRIPTION OF CERTAIN ILLUSTRATIVE EMBODIMENTS

The proposed solution enables the generation of proofs of use of a relay in a computer network.

Figures 1, 2:
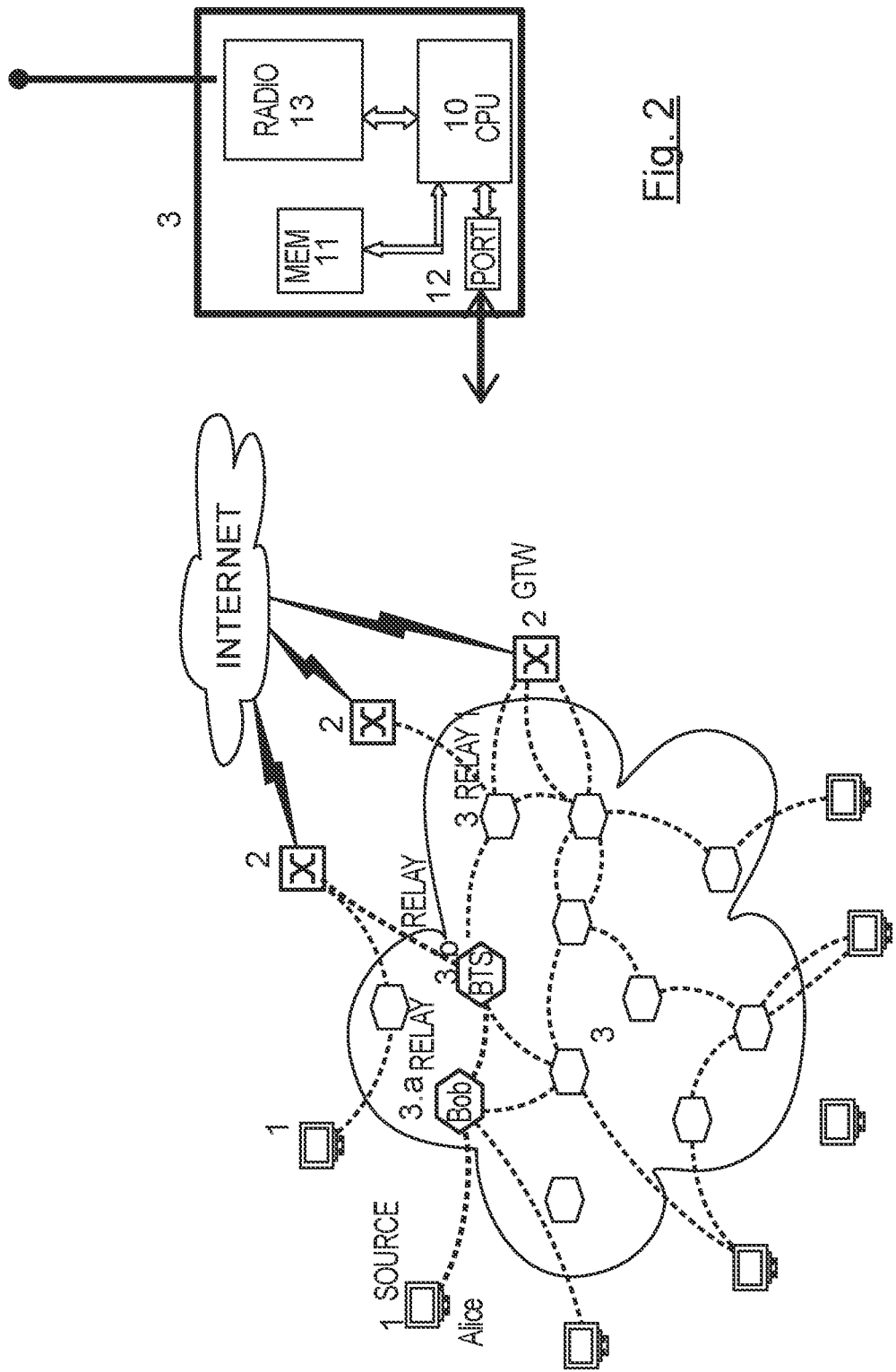
FIG. 1 represents a computer network comprising the different devices proposed for the method for preparing usage data according to one embodiment.
FIG. 2 illustrates the different components of a communications relay according to one embodiment.

FIG. 1 represents a computer network comprising different devices used to transmit data according to one embodiment. In addition to transmitting data, this network ensures the anonymity of the communications. Among such networks, we may cite the TOR network, also known as the "Darknet". The data transmissions are encrypted to mask their sources, thus providing anonymity of communications. The invention is implemented when a source device 1 communicates with a destination device 2 through relays 3. The relays are typically decoders (boxes), 4G cells, or femto cells (µ/fCell).

According to one example of an embodiment, the source device 1 belongs to a customer whom we shall call "Alice" here below in the document. Alice wishes to enter into communication with her gateway (GtW) 2. The different devices can belong to different operations, for example Alice is a customer of an operator known as "Blue" and enters into communication with a first relay 3, belonging to an operator called "Red", and then a BTS3.b belonging to an operator called "Green" to finally reach the gateway of the operator Blue. From this gateway, Alice has access to remote networks and especially the Internet. The communications circuit between Alice and her gateway GtW, also called a communications circuit, or simply a circuit, therefore passes through the relays 3.a and 3.b; the fact of passing through two relays is only one example. It is clear that a circuit between a source device 1 and a destination device 2 can include any unspecified number of relays. The way of defining this circuit calls for well-known routing technologies that do not need to be described herein. The method comes into play to produce proofs of use or PoUs of relays.

The method for preparing proof of use data can be implemented within a network using decentralized applications, a P2P (peer-to-peer) application that can be implemented in any network of peers enabling a platform of community connectivity (community Wi-Fi, 4G, 5G roaming, etc.) to be made to work without a mediator, using a shared memory to store the timeline of the events. By incorporating this method, the precise use of a circuit by a user and the bandwidth (i.e. the flowrate) offered by each relay of this circuit to a particular user can be determined. By analyzing the use of a relay over time, a decision can be taken on whether to keep it or to eliminate it.

FIG. 2 illustrates the different components of a communications relay according to one embodiment. The relays 3 typically comprise a central processing unit 10 capable of executing a program recorded in a memory 11 and a wired communications port 12, using the Ethernet for example, to communicate with a gateway or with other relays. This link permits the communications between a source device 1 and a destination device 2. According to one particular embodiment, the relay 3 has available a long-range radiocommunications module 13 (GSM network) and/or a short-range radiocommunications module (Wi-Fi, Bluetooth, etc.). A similar diagram can illustrate the different components of a source device 1 and/or a destination device 2.

After this detailed description, given as an example, of the different devices implementing the invention, an explanation shall now be given of the way in which they cooperate.

In a first stage, the source device 1 sets up a communication with a destination device 2, by implementing a path, here below called a circuit, determined by a list of the devices that transmit the data of the communication. Then, the source device 1 uses the circuit thus set up to send requests in order to record proofs of use of each of these devices in a shared memory. This shared memory called a "ledger" is accessible to any device whatsoever of the computer network and especially to the relays.

Figure 3:
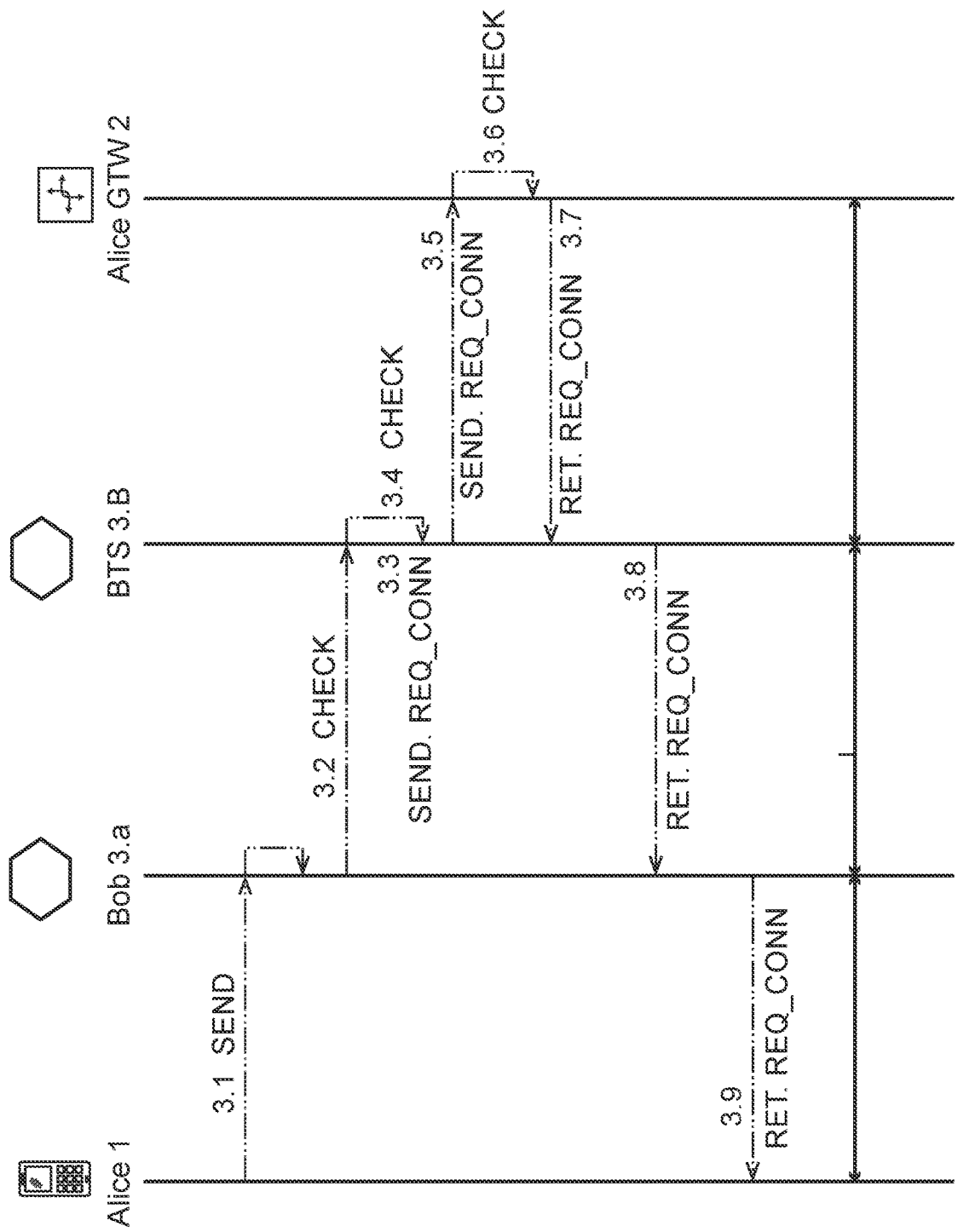
FIG. 3 illustrates the establishment of a circuit in order to set up a communication between two devices according to one embodiment.

FIG. 3 illustrates the different communications on a circuit using a connection between a source device 1 and a destination device 2, and enabling retrieval of the list of devices constituting a communications circuit, according to one embodiment.

At a certain point in time, Alice sets up a communication with a gateway of her operator (Blue operator) to access if necessary a computer network such as the Internet. A communications request is sent to the network and a circuit passing through different relays is set up. In the example that shall be described here below, Alice communicates with a modem called "Bob". Bob communicates with a BTS of the operator Green. A BTS or base transceiver station is one of the basic elements of the GSM mobile telephony cell system. The BTS Green communicates with the Blue gateway of Alice's operator. According to this example, the communications circuit is therefore the following:

Alice—Modem Bob—BTS Green—BlueGtWgateway

At a first stage, at the step 3.1, Alice sends a request for connection comprising at least one header value identifying the type of request, the identity of her operator, Alice's identifier Ka and a certificate Ca. The identifier of the source device 1 is advantageously its public key and the certificate is a particular value obtained by cryptographic computation using Alice's secret key. The modem Bob receives the request and verifies Alice's certificate (step 3.2). This verification is done by a cryptographic computation in using the value of the certificate and Alice's public key. If the certificate is not correct, the communication is blocked.

The modem Bob also checks to see whether Alice is not on a blacklist. To this end, Alice's identifier is compared with all the identifiers present in this list. If this is the case, then the communication is blocked. Since a blacklist is usually managed by each operator, the modem Bob must download the blacklist of the operator Blue which is Alice's operator in order to verify that this source device 1 is authorized to communicate. According to one variant of an embodiment, all the prohibited communications devices are referenced in a comprehensive list, whatever their operators.

If all the checks of the step 3.2 are successful, the connection request can be propagated across the circuit that leads to Alice's gateway.

The modem Bob adds its identifier and its certificate to the data when the request sent by Alice passes through. Similarly, to Alice's data, the identifier of the model Bob is advantageously its public key Kb, and the certificate Cb is a particular value obtained by cryptographic computation using the secret key of the modem Bob. At the step 3.3, the modem Bob sends the new connection request, enriched by its own data, on the circuit that leads to Alice's gateway.

At the step 3.4, the BTS Green carries out checks similar to those made by the modem Bob on all the identifiers and circuits present in the request. Thus, the BTS checks Alice's certificate Ca and the certificate Cb of the modem Bob using their keys. If the two certificates are not correct, then the call is blocked. The BTS Green then checks the authorizations of Alice and of the modem Bob in checking that the identifiers of Alice or of the modem Bob are not referenced in a blacklist. For this check, the BTS Green uses to this end the identifiers Ka and Kb.

If all the checks are made successfully, the connection request can get propagated over the circuit and reach Alice's gateway. The BTS Green then, at the passage of the request sent by Bob's modem, adds its Alice identifier and its certificate. Similarly to Alice's and the modem Bob's data, the identifier of the BTS Green is advantageously its public key Km and the certificate Cm is a particular value obtained by cryptographic computation using the secret key of the BTS Green. At the step 3.5, the BTS Green sends, on the circuit leading to Alice's Blue gateway, the connection request which is enriched with its own data.

The Blue gateway of the same operator as Alice receives the request containing the following pairs of data: [(Ka,Ca), (Kb,Cb), (Km,Cm)].

At the step 3.6, the Blue gateway which is the destination device 2 of the communication with Alice, checks all the certificates by using the public keys transmitted and verifies that none of the identifiers of the previous devices is present in a blacklist. If all the checks are made successfully, the connection requests can then return to the source device 1, i.e. towards Alice.

The Blue gateway 2 adds, at the passage of the request sent by the BTS Green, its identifier Kg and its certificate Cg. The connection request then contains the following pairs of data: [(Ka,Ca), (Kb,Cb), (Km,Cm), (Kg, Cg)]. It can thus be noted that these data describe and identify each device constituting the circuit between Alice and her gateway.

At the step 3.7, the gateway 2 sends, towards Alice, the request and its current content enriched by the certificates and identifiers of all the devices constituting the circuit.

At the step 3.8, the return connection request travels through the same devices as on the outbound journey, up to Alice. At this time, the connection with the gateway 2 is set up and Alice knows, by their identifiers the devices of the circuit to reach the connection (step 3.9). Alice also receives the certificates of the relays and can if necessary check them.

Figure 4:
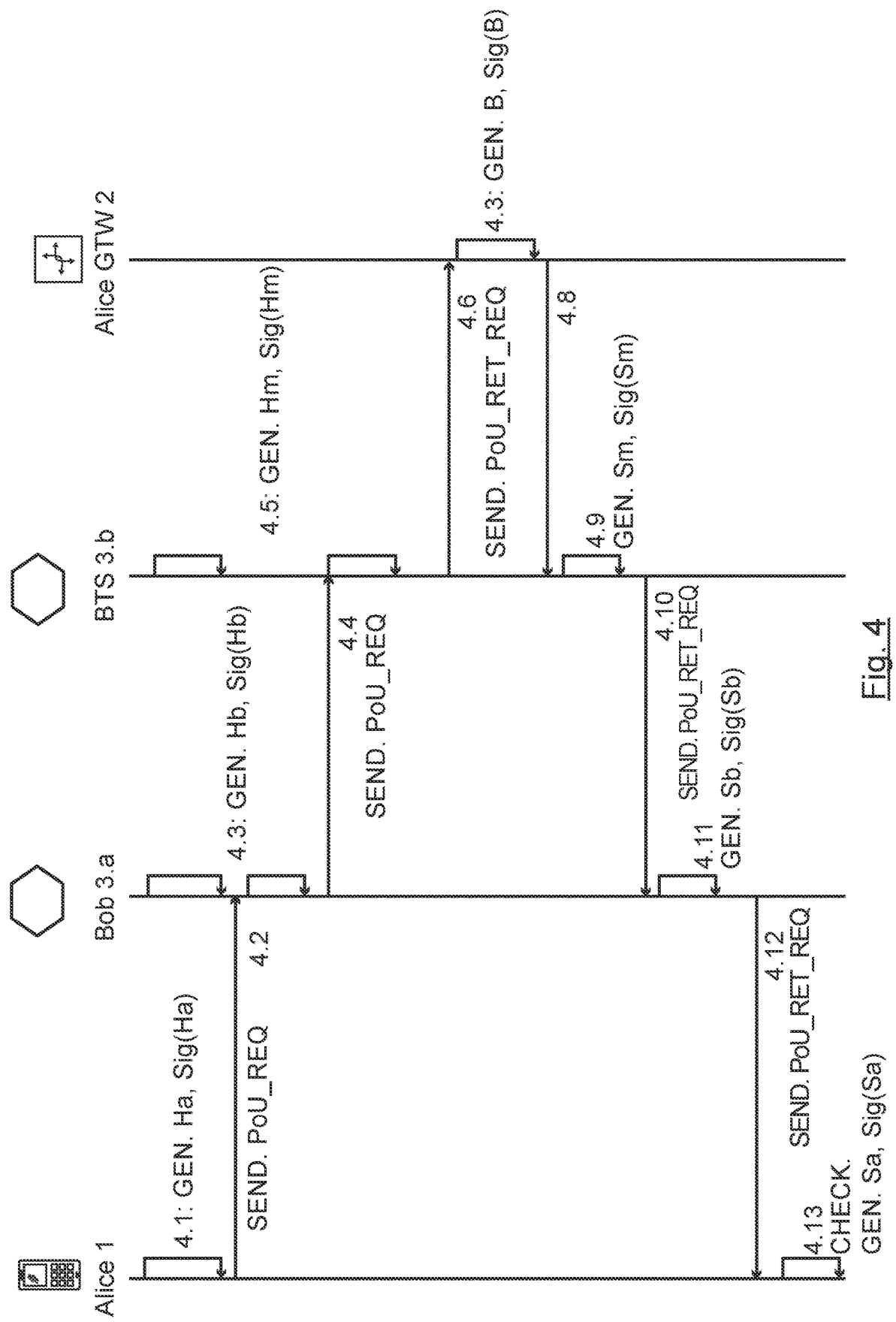
FIG. 4 illustrates the different communications on a circuit in order to establish proofs of use of the relays of a circuit connecting two devices according to one embodiment.

FIG. 4 illustrates the different communications on a circuit with a view to establishing proofs of use, these communications regularly coming into play during a connection between Alice 1 and her gateway Blue 2.

After having set up and used a connection with her gateway, Alice sends a request to generate a proof of use by all the devices of the circuit. In a first stage, and at the step 4.1, Alice generates a random number Sa and reduces its size by a function known as a "hash" function to generate a challenge Ha that is also called a "digital imprint". This value is signed by Alice and generates a signature Sig(Ha). Alice sends a request called a "PoU request" comprising at least one header value identifying the type of request, Alice's challenge Ha and the signature Sig(Ha).

At the step 4.2, the modem Bob receives the PoU request. The modem Bob then generates a random number Sb, compresses it into a challenge Hb and concatenates the following values:

Ha, Sig(Ha), Hb, and signs the data thus concatenated to generate a signature Sig(Hb) (step 4.3). The modem Bob adds to the data of the PoU request sent by Alice, its challenge Hb and a signature Sig(Hb). The modem Bob sends, on the circuit leading to Alice's gateway, the new PoU request enriched with its data.

At the step 4.4., the BTS Green receives the PoU request. The BTS Green generates a random number Sm, compresses it into a challenge Hm, concatenates the values:

Ha, Sig(Ha), Hb, Sig(Hb), Hm, and signs the data thus concatenated to generate a signature Sig(Hm) (step 4.5). The BTS Green adds, to the data of the PoU request sent by the modem Bob, its challenge Hm and the signature Sig (Hm). At the step 4.6, the BTS Green sends the new PoU request, enriched with its own data, to Alice's gateway.

At the step 4.7, the gateway Blue 2 which is the destination device of the communication with Alice, receives the PoU request and its content called "PoU half-frame" and concatenates the values received into a packet B containing:

Ha, Sig(Ha), Hb, Sig(Hb), Hm, Sig(Hm)=B

The gateway Blue 2 signs the data thus concatenated to generate a signature Sig(B). At the step 4.8, the gateway 2 sends back to Alice the PoU request and its content: [B, Sig(B)]. Assuming that the routing does not change, the return of the PoU frame passes through the same devices as those describing the circuit taken on the outbound journey.

In receiving the return of the PoU frame (step 4.9), the BTS Green reutilizes the random number generated on the outbound journey Sm, concatenates the values:

B, Sig(B), Sm, and signs the data thus concatenated to generate a signature Sig(Sm). The data of the PoU frame are then recorded in the BTS Green which henceforth knows the devices of the circuit between Alice and her gateway as well as the security parameters of these devices. At the step 4.10, the BTS Green sends back, to the modem Bob, the PoU request and its content: [B, Sig(B), Sm, Sig(Sm)].

In receiving the return of the PoU frame (step 4.11), the modem Bob reutilizes the random number generated on the outbound journey Sb, concatenates the values:

B, Sig(B), Sm, Sig(m), Sb and signs the data thus concatenated to generate a signature Sig(Sb). The data of the PoU frame are then recorded in the modem Bob. At the step 4.12, the modem Bob sends back to Alice the PoU request and its content: [B, Sig(B), Sm, Sig(m), Sb, Sig(Sb)]. The return PoU request then returns to the device that launched it.

At the step 4.13, Alice receives the return PoU request and verifies the authenticity of the signatures from the random numbers generated. The verification is made by using the public keys of each device. If the authenticity of the signatures is verified, then a proof of use can be generated for each device concerned. If not, it is then necessary to relaunch the communication in passing through another path.

If the authenticity of all the signatures is verified, then Alice concatenates the values received:

B, Sig(B), Sm, Sig(m), Sb, Sig(Sb), Sa and signs the data thus concatenated to generate a signature Sig(Sa). The value obtained by the concatenation of the following fields:

B, Sig(B), Sm, Sig(m), Sb, Sig(Sb), Sa, Sig(Sa), constitutes a PoU value which is a proof that the following devices, Alice, the modem Bob, the BTS Green and the gateway Blue 2, have consumed bandwidth to transmit a communication between Alice and her gateway.

According to one improvement, the PoU request that Alice transmits at the step 4.2 also comprises a frame number. This number can be used to identify the PoU frame on the outbound and return journeys.

According to a first embodiment, each device of the circuit generates its own random number (Sa, Sb, Sm). According to one alternative embodiment, a single random number is used, and it is generated by Alice. This number Sa is transmitted in the PoU request sent by Alice to Bob (step 4.2), then it is transmitted from relay to relay until it returns to Alice. Each relay of the circuit and the destination device 2 uses Sa to compute its own signature. In this way, all the signatures are customized by Alice and security is reinforced.

During her communication with its gateway 2, Alice exchanges a certain quantity of data with it. Each relay can determine the quantity of data that travels through it. In this way, this information can be subsequently used to assess the level of use of each relay.

Figure 5:
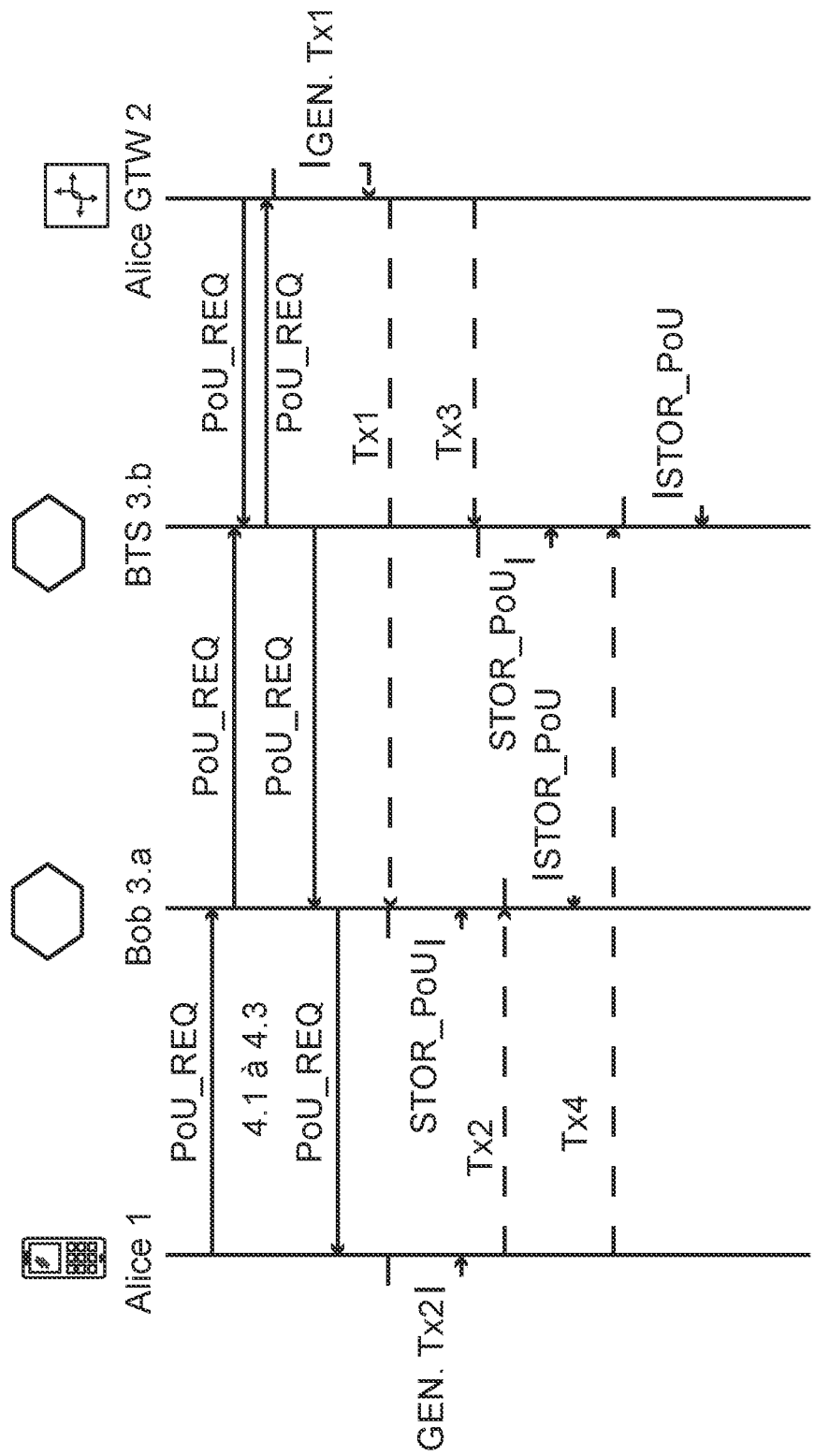
FIG. 5 illustrates the different communications on a circuit to record proofs of use of a relay in a shared memory according to one embodiment.

FIG. 5 illustrates the different communications on a circuit to generate proofs of use from each relay. The proofs of use are recorded in the shared memory accessible by any device of the computer network. The proof of recording is a data packet produced by each relay of a circuit that asks for its recording in a shared memory of the network. The generation of the proofs of use of each relay is done at the initiative of the source device 1 and the destination device 2, namely Alice and her gateway Blue 2, and is triggered by requests called "transaction requests" or "transactions".

As illustrated in FIG. 5, once the PoU frame has travelled through the circuit on the outbound and return journey (steps 4.1 to 4.13), Alice 1 and her gateway Blue 2 can send transactions enabling each relay to record proofs of use. The transaction Tx1 recorded by the modem Bob is generated and signed by the gateway Blue 2 from the PoU half-frame provided by the gateway Blue. This step is necessary to certify all the steps that have just taken place. The transaction Tx2 recorded by the modem Bob is generated and signed by Alice from the PoU frame given by Alice. The transaction Tx3 recorded by the BTS Green is generated and signed by the gateway Blue from the PoU half-frame given by the gateway Blue 2. The transaction Tx4 recorded by the BTS Green is generated and signed by Alice from the PoU frame given by Alice.

Each relay that receives a transaction triggers the sending of a request for recording a proof of use to a shared memory. The data contained in this request and registered as proofs of use typically comprise the data contained in the PoU frame or PoU half-frame and the signature of the device that has sent this frame.

The transaction Tx1 contains for example the following fields:
- half PoU (generated by the gateway Blue 2 at the step 4.7 of FIG. 4)+Kg (public key of the gateway Blue)+Kb (public key of the modem Bob),
- the signature of the gateway Blue 2.

The transaction Tx2 contains for example the following fields:
- PoU (generated by Alice at the step 4.13 of FIG. 4)+Ka (Alice's public key)+Kb (public key of the modem Bob),
- Alive's signature.

The transaction Tx3 contains for example the following fields:
- half PoU (generated by the gateway Blue 2 at the step 4.7 of FIG. 4)+Kg (public key of the gateway Blue)+Km (public key of the BTS Green)
- the signature of the gateway Blue 2.

The transaction Tx4 contains for example the following fields:
- PoU (generated by Alice at the step 4.13 of FIG. 4)+Ka (Alice's public key)+Km (public key of the BTS Green)
- Alice's signature.

In general, the source device triggers the sending of as many transactions as there are relays identified in the circuit traversed by the PoU frame. At the same time, the destination device also triggers the sending of as many transactions (Tx1, Tx2) as there are relays traversed by the PoU half-frame. In this way, the proofs of use are produced within the circuit whatever the sense of transmission of the data.

The PoU frame received by the source device 1 and the PoU half-frame received by the destination device 2 comprise the identifiers of the relays traversed. In the example illustrated by FIGS. 3, 4 and 5, the two relays, namely the modem Bob and the BTS Green, which are situated between Alice and her gateway, each receive two transactions from them.

At the reception of a transaction, each relay 3 asks for the recording of proof of use in the shared memory. Following this request, the shared memory records the proof of use associated with this relay. Advantageously, the shared memory sends an acknowledgement of reception indicating that the recording is accurately done. According to one variant, it is the relay itself that verifies the recording by sending a read request.

If a relay that has sent a recording request to the shared memory receives nothing at the end of a certain period of time, then this relay blocks the circuit. The communication between the source device 1 and destination device 2 is then interrupted and a new request for setting up a new communications circuit must be relaunched by Alice.

Once the proofs of use are sent by the relays and recorded in the distributed memory, they can be consulted at any time by applications to determine the use of each relay of the network.

Figure 6:
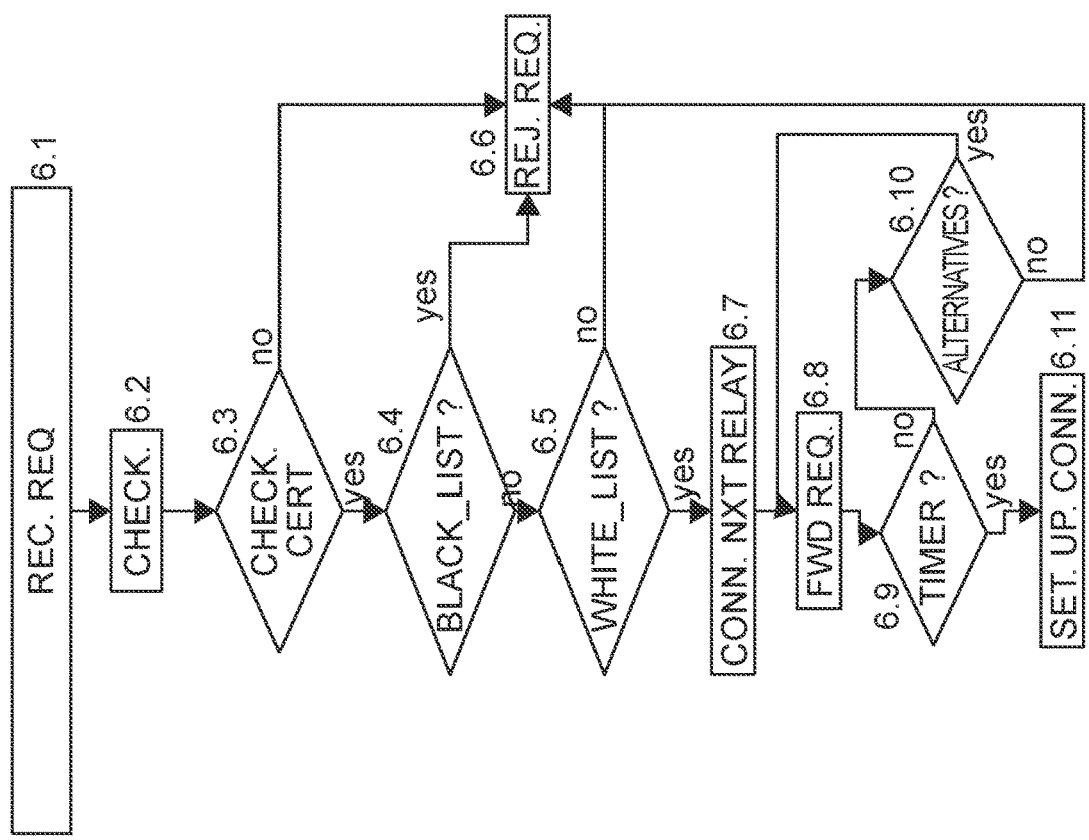
FIG. 6 presents an example of a flowchart of the steps of a method for setting up a connection executed in a first relay.

FIG. 6 presents an example of a flowchart of the steps of a method for setting up a connection executed in a first relay, the modem Bob for example. These steps come into play when Alice starts communicating with this relay to reach her gateway. At the step 6.1, Alice sends the modem Bob her public key serving as an identifier and her certificate. The modem Bob then starts a series of checks (step 6.2). The modem Bob retrieves, at the step 6.3, the value of the certificate sent by Alice and checks its validity by using the transmitted public key. By using Alice's identifier, the modem Bob verifies that Alice is not on a blacklist and that her operator has truly given her rights to communicate (step 6.4). The relay can also check that Alice's device is complying with certain internal rules, for example the fact that the level of Alice's reputation is above a certain threshold, that Alice's operator is on a white list of the relay if this list exists, etc. (step 6.5). If any one of these checks does not verify compliance, then it is not possible to set up a communication between Alice and her gateway and the connection is rejected (step 6.6).

If not, at the step 6.7, the relay goes into communication with the next relay within the circuit in order to reach the destination device 2, or to reach the destination device 2 directly. To this end, a request for communication is launched towards the following relay (step 6.8) and a timer is launched defining a duration during which the connection must be set up (step 6.9). If the communication is not set up, the relay looks for other alternatives to set up the circuit between Alice and her gateway and, at the step 6.10, checks that these alternatives exist. If this is not the case, then the connection is rejected (step 6.6.). If not, the alternatives are tested and if at least one of them works, then the connection with the next relay or the destination device 2 is set up (step 6.11).

Figure 7:
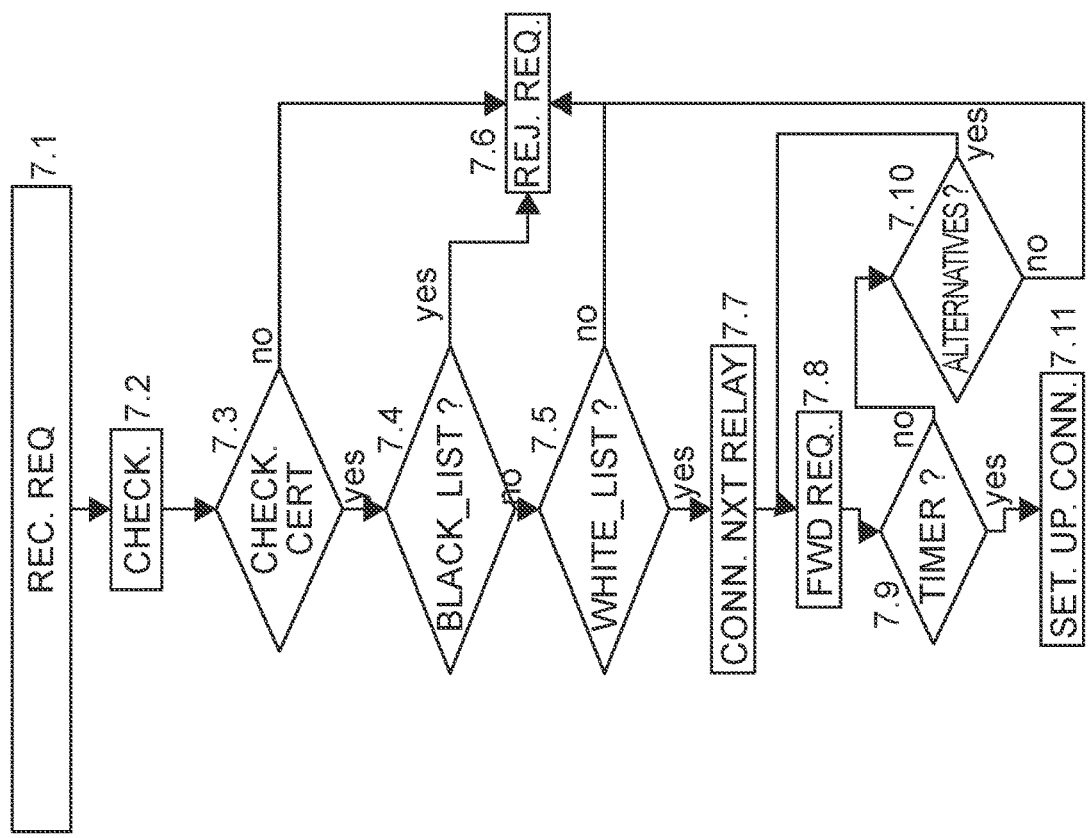
FIG. 7 presents an example of a flowchart of the steps of a method for setting up connections executed in the following relay.

FIG. 7 presents an example of a flowchart of the steps of a method for setting up connections executed by the relay following the one for which the steps are shown in FIG. 6, this relay is for example the BTS Green. The following steps are identical between the two flowcharts: 6.1 and 7.1, 6.2 and 7.2, 6.6 and 7.6, 6.7 and 7.7, 6.8 and 7.8, 6.9 and 7.9, 6.10 and 7.10, 6.11 and 7.11.

The BTS, at the step 7.3, retrieves the value of the certificates sent by Alice and the modem Bob and checks their validity by using the public keys transmitted. At the step 7.4, in using their identifiers, the BTS Green verifies that Alice is not on a blacklist and that the modem Bob is not on a blacklist either. Through this check, the BTS Green verifies especially that the operators of these two devices have truly given them the rights to communicate. The BTS Green can also check that Alice and the modem Bob comply with certain internal rules, for example it can check that Alice's reputation is above a certain threshold, that Alice's operator is on a white list of the relay if this list exists, (step 7.5). If any one of these checks does not verify compliance, then it is not possible to set up a communication between Alice and her gateway, and the connection is rejected (step 7.6).

Figure 8:
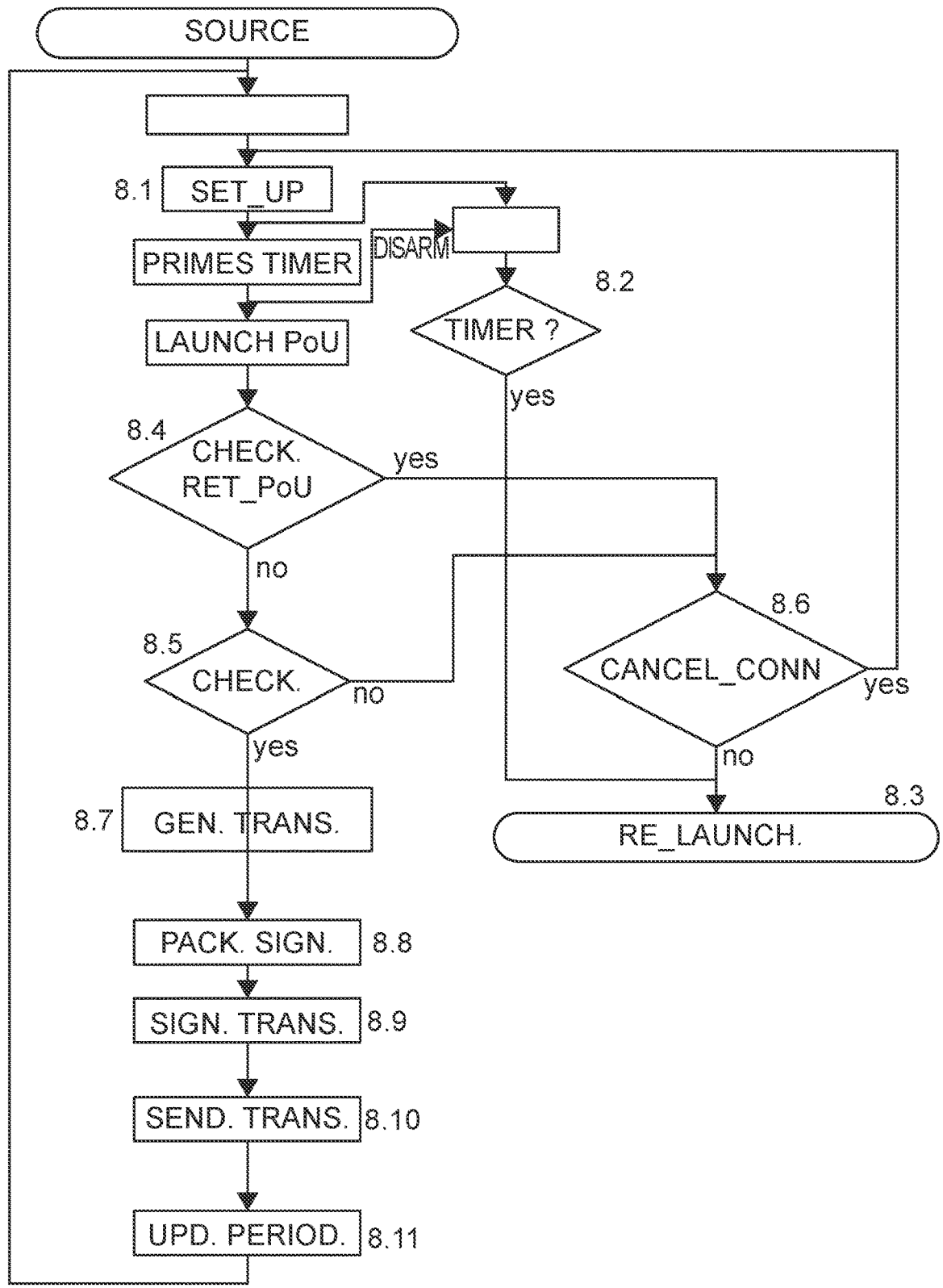
FIG. 8 presents an example of a flowchart of the steps for generating a PoU frame in a customer device.

FIG. 8 is an example of a flowchart of the steps for generating a PoU frame on the customer side, i.e. on the source device 1 side. At the step 8.1, the circuit between Alice and her gateway is set up and passes through the relays 3: the modem Bob 3.*a* and the BTS Green 3.*b*.

According to one particular embodiment, the PoU frame is sent by the source device 1 during the sending of the packets sent at regular intervals. In this way, the proofs of use of PoU are generated periodically, and it is possible, during a given period, to determine the use of each relay of a circuit. In practice, and according to an exemplary embodiment, the periodicity of sending of PoU requests is ten minutes.

At the step 8.2, Alice primes a timer and launches the PoU request, and then waits for the return of the PoU frame. If the return frame is not received during the period defined in the timer, then the return frame is considered to be not received and the connection cannot be kept. It is then necessary to relaunch the communication in passing through another path (step 8.3) and carry out the steps illustrated in FIG. 3.

At the step 8.4, Alice verifies the integrity of the PoU return frame. This check is done in verifying that the computation of the signature is accurately done. At the step 8.5, Alice carries out a check by using the public key. If these latter two checks reveal errors, the data are degraded, and it is possible to make a retry in hoping that the communication will be better at the next try. At the step 8.6, when a certain number of attempts (for example three attempts) are made, the connection cannot be kept and is therefore cancelled (step 8.3).

If not, Alice launches the process for generating transactions addressed to all the relays identified in the circuit (step 8.7). At the step 8.8, Alice packetizes the signature data in order to constitute the transaction requests that will be processed in each relay (in this case the modem Bob and the BTS Green). Alice then signs the data packets with her own key (step 8.9). At the step 8.10, the transactions are transmitted to the modem Bob, if they are not intended for him, he retransmits them to the next relay. The last step of the loop relates to the updating of the periodicity of the sending of the PoU frames (step 8.11).

According to one variant, the PoU frame is sent by the source device 1 whenever the quantity of data exchanged with the destination device 2 since the last sending of the PoU frame exceeds a determine quantity of data. In this way, the proofs of use are generated regularly, and it is easy to determine the quantity of data exchanged by each relay by counting the number of proofs of use generated.

Figure 9:
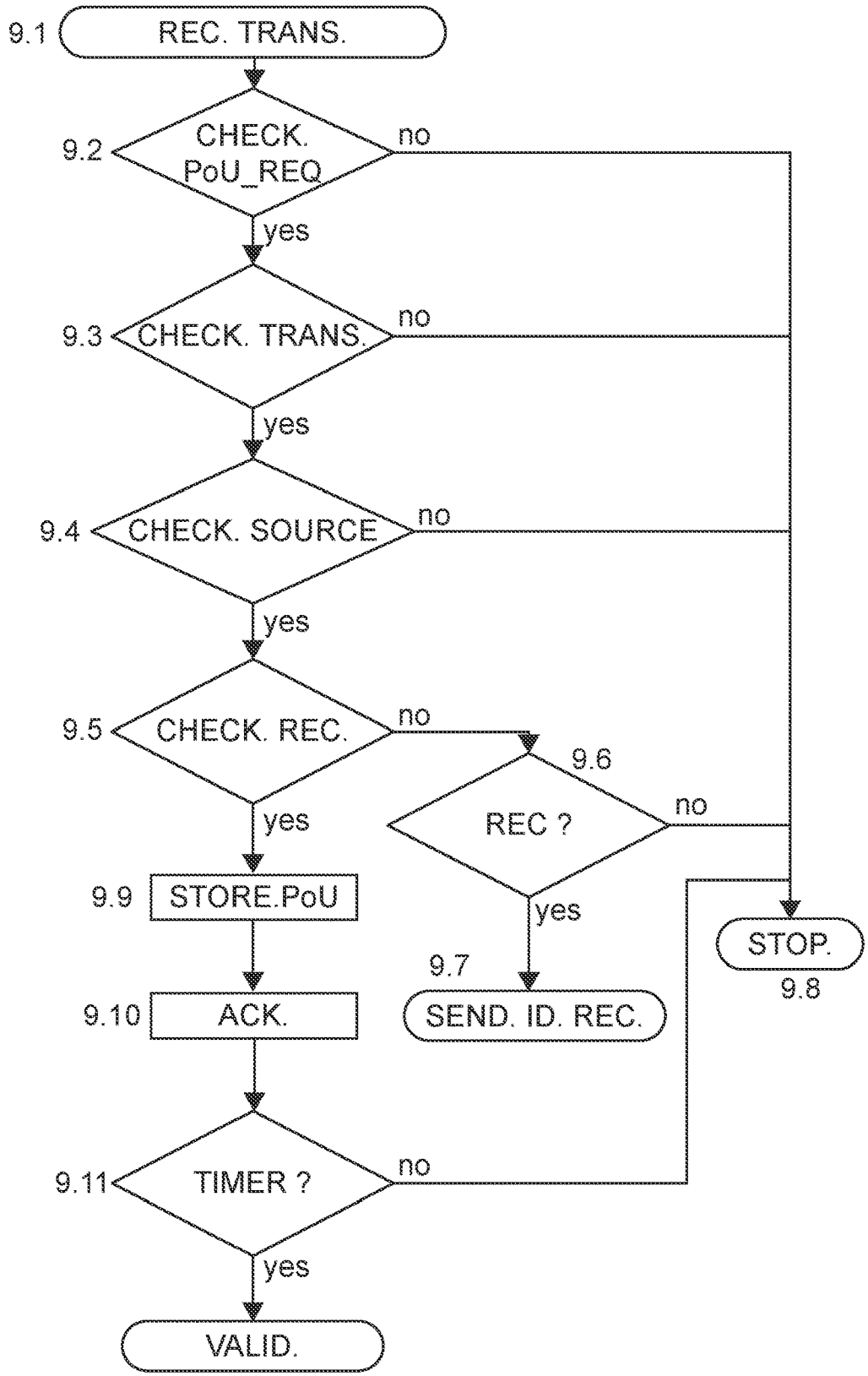
FIG. 9 is an example of a flowchart of the steps for processing transactions at the level of a relay.

FIG. 9 presents an example of a flowchart of the steps for the processing of transactions in a relay 3, for example the modem Bob. Prior to these steps, the circuit between Alice and her gateway is set up and passes through the relays, namely the modem Bob and the Green BTS, Alice has sent a PoU request and has just sent a transaction request to the modem Bob (step 9.1).

At the step 9.2, the modem Bob checks to see if the PoU half-frame that it had previously received at the step 4.4 is truly recorded in its memory and is valid. Then, at the step 9.3, the modem Bob verifies the consistency between the data contained in the transaction that it has just received from Alice and the PoU frame data that are recorded in memory. The modem Bob checks especially to see if its rank in the transaction request truly corresponds to its place in the circuit. The modem Bob also verifies that the source device 1, which is the sender of the PoU request, is truly the same one as the one that has just sent the transaction request, namely Alice (step 9.4).

At the step 9.5, the modem Bob checks that it is truly the intended recipient of this transaction request. If this is not the case, the modem Bob checks to see if the intended recipient of this request is a device that is situated after it in the circuit defined in the PoU frame (step 9.6). If this is the case, then the modem Bob transmits a transaction request to it (step 9.7). If not, or if one of the checks made during the steps 9.2, 9.3 and 9.4 is not accurate, then the modem Bob decides that the transaction is not valid and interrupts it (step 9.8). Advantageously, the modem Bob sends a report of non-execution to the sender of the transaction, namely Alice.

If all the data of the transaction are checked accurately, then at the step 9.9, the modem Bob sends the data packet constituting the transaction to the shared memory. The shared memory then records the transaction thus constituting a proof that the modem Bob has truly been used during a communication between Alice and her gateway Blue 2 and, within an allotted time limit, sends back an acknowledgement of reception to the modem Bob(step 9/10). If the modem Bob does not receive any acknowledgement of reception in the allotted time limit (step 9.11), then it decides that the transaction is not valid and interrupts it (step 9.8).

If the acknowledgement of receipt is truly received from the shared memory, then the transaction is valid and the proof of use is properly recorded in the network (step 9.11) and can be consulted at any time.

Figure 10:
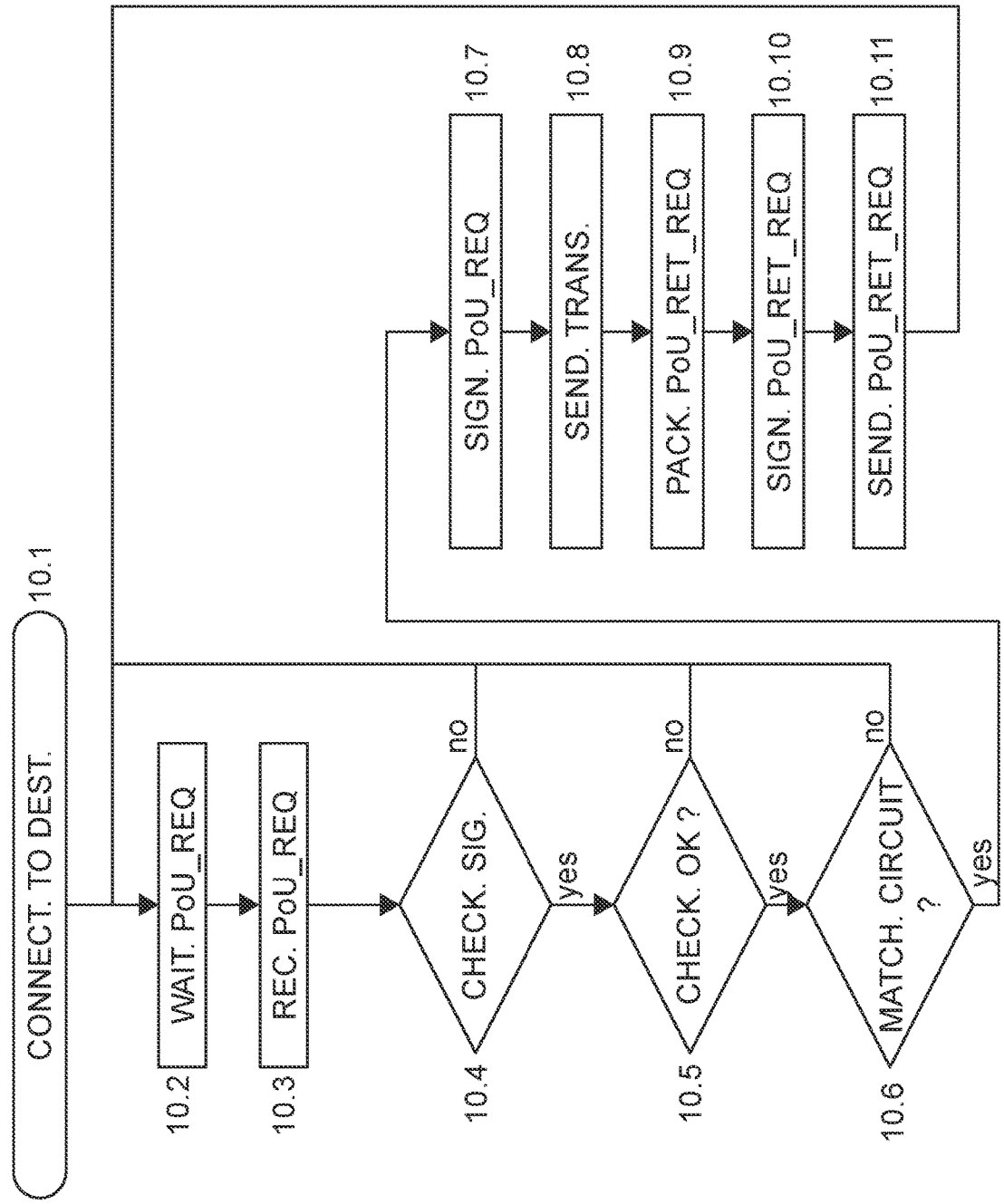
FIG. 10 presents an example of a flowchart of the steps for the processing of a PoU request by the destination device.

FIG. 10 presents an example of a flowchart of the steps for the processing of a PoU request by the destination device 2, namely Alice's gateway Blue 2.

At the step 10.1, Alice is connected to her operator via the gateway Blue 2, which is the destination device 2 of the circuit and which awaits reception of a PoU request (step 10.2). At the step 10.3, the request PoU is received and the checks can then begin.

At the step 10.4, the gateway Blue 2 checks to see if the signatures contained in the PoU frame are valid. This relates to all the signatures of the devices constituting the circuit, namely Alice, the modem Bob and the Green BTS. At the step 10.5, the gateway Blue 2 verifies that an overflow has been reached, in checking that the parameter m is smaller than a threshold value. The gateway Blue 2 also checks to see if the list of devices identified in the PoU frame corresponds to the circuit between the source device 1 and itself (step 10.6). If one of these checks is not positive, then the request is interrupted and the gateway Blue 2 again starts awaiting the arrival of each new PoU request (step 10.2).

If all the checks are positive, then the gateway Blue 2 sends transactions and the PoU return frame.

The gateway Blue 2 first of all signs the PoU half-frame that has just been received (step 10.7). The gateway Blue 2 triggers the sending of as many transactions as there are relays 3 identified during the communication of the source device 1 to the destination device 2. In the present case, the gateway Blue 2 sends a transaction request to Alice, the modem Bob and the Green BTS (step 10.8). In this way, each of these devices can prove that it has been truly used to transmit, at least in one direction, a communication between Alice and her gateway.

At the step 10.9, the gateway Blue 2 packetizes the data constituting the PoU return frame, signs the data (step 10.10) and sends the return frame to the first relay of the circuit, namely the relay Green (step 10.11). The return frame then returns by the same circuit and is received by the source device 1, namely Alice.

The present invention makes it possible especially to save authenticated proofs of use of different relays 3 transmitting data between a source device 1 and a destination device 2. The proofs of use that can be consulted at any time by connecting up to a shared memory are usable especially by applications dedicated to the optimizing of the network architecture or to the invoicing of bandwidth allocation or to the renting of devices.

Depending on the chosen embodiment, certain acts, actions, events or functions of each of the methods described in the present document can be done or can occur in an order different from the one in which they have been described, or can be added, merged or else not be carried out or not take place as the case may be. In addition, in certain embodiments, certain acts, actions or events are carried out or take place concurrently and not successively.

Although described through a certain number of detailed exemplary embodiments, the proposed methods and the corresponding devices comprise different variants, modifications and improvements that shall appear clearly to those skilled in the art, given that these different variants, modifications and improvements are part of the scope of the invention, as defined by the following claims. In addition, different aspects and characteristics described here above can be implemented together, or separately or else substituted for one another, and all the different combinations and sub-combinations of the aspects and characteristics form part of the scope of the invention. In addition, it can happen that certain devices described here above do not incorporate all the modules and functions described for the preferred embodiments.

The invention claimed is:

1. A method of preparing usage data for a relay implemented in a computer network comprising at least one source device, one destination device, at least one shared memory and at least one relay constituting a circuit to set up a communication between the source device and the destination device, the method being implemented in the source device and comprising:
retrieving identifiers of the at least one relay constituting the circuit,
sending a request for generating a proof of use, called a PoU frame, addressed to the destination device, each of the at least one relay of the circuit adding to the PoU frame, at the time of passage, a signature made from a challenge and a key proper to the relay, the PoU frame comprising a value of the challenge used by each of the at least one relay to compute the signatures;
retrieving, in return of said PoU frame, at least the signatures of each of the at least one relay; and
verifying the signatures received by using the public keys of the at least one relay of the circuit, the authentication of the signatures triggering the following:
preparing, from the data received, an ordered list of identifiers of the at least one relay used to set up the communication, and
sending transaction frames addressed to each of the at least one relay identified in the ordered list to generate proofs of use comprising at least the signatures contained in the PoU frame, the transaction frames being designed to trigger the sending by each of the at least one relay of a proof of use recorded in a shared memory.

2. The method of claim 1, wherein, subsequently to the retrieval of the identifiers of each of the at least one relay, the source device compares the identifiers received with identifiers of a blacklist of devices, the presence of a relay identifier in the blacklist stopping the communication between the source device and the destination device and triggering the determining of a circuit that does not pass through the identified relay.

3. The method of claim 1, wherein the PoU frame is sent by the source device at regular time intervals.

4. The method of claim 1, wherein the PoU frame is sent by the source device whenever the quantity of data exchanged with the destination device since the last sending of the PoU frame exceeds a determined quantity of data.

5. A method of recording usage data for a relay implemented in a computer network comprising at least one source device, one destination device, at least one shared memory and at least one relay constituting a circuit to set up a communication between the source device and the destination device, the method being implemented in each of the at least one relay and comprising:
sending the identifier of the relay to the source device;
receiving a PoU frame coming from the source device or from the preceding relay within the circuit;
computing a challenge of the relay and a signature of a concatenation of challenges and signatures of the source device and preceding relays with the challenge, using a key proper to the relay;
adding at least this signature and a value of the challenge used by each of the at least one relay to compute the signatures to the PoU frame and transmitting the PoU frame to the destination device or to the relay present in the circuit in the direction of the destination device, depending on the position of the relay in the circuit;
receiving at least one transaction frame coming from the source device or from the destination device, the transaction frame comprising at least the signatures of each of the at least one relay contained in the PoU frame; and
sending, following the reception of each transaction, a request for recording, in a shared memory, a proof of use of the relay comprising at least the signatures of each of the at least one relay of the circuit.

6. The method of claim 5, further comprising reception of a PoU return frame coming from the destination device containing at least a set of identifiers of the PoU frame received, transmission of the received frame to the source device and a subsequent reception from the source device of a transaction frame triggering a generation of a proof of use of the relay.

7. The method of claim 5, wherein the relay receives, from the shared memory, a return message indicating that the recording has been properly done, an absence of the return message for a determined duration after the sending triggering an elimination of the communications circuit.

8. The method of the claim 5, wherein the identifiers of the at least one relay comprise a public key value characteristic of each of the at least one relay.

9. The method of claim 7, wherein the relay provides a certificate produced from the secret key associated with its public key, the certificate being added to the PoU frame, the relay verifying the certificate sent by a preceding relay by means of a cryptographic computation bringing the public key into action.

10. The method of claim 9, wherein the certificate associated with the relay is generated from a random number.

11. The method of the claim 5, wherein the PoU frame received comprises the value of the challenge used by the relay to compute the signature by means of the secret key of the relay.

12. A method of preparing usage data for a relay implemented in a computer network comprising at least one source device, one destination device, at least one shared memory and at least one relay constituting a circuit to set up a communication between the source device and the destination device, implemented in the destination device and comprising:
receiving the identifier of each of the at least one relay present in the circuit;
receiving a request for generating a proof of use, called a PoU frame, coming from the source device and containing at least one signature made by each of the at least one relay from a challenge and a key proper to each of the at least one relay, the PoU frame comprising a value of the challenge used by each of the at least one relay to compute the signatures; and
verifying received signatures by using the public keys of each of the at least one relay of the circuit, the authentication of the signatures triggering the following:
preparing, from the data received, an ordered list of identifiers of the at least one relay used to set up the communication, sending transaction frames addressed to each of the at least one relay identified in the list to generate proofs of use of the at least one relay comprising at least the signatures contained in the PoU frame, the transaction frames being designed to trigger the sending, by each of the at least one relay, of a proof of use recorded in a shared memory.

13. The method of claim 12 further comprising preparing a PoU return frame comprising the certificates and the identifiers of at least all the relays of the circuit, and sending the PoU return frame to the source device with the signature made by use of a key of the destination device.

14. A source device intended to enter into communication with a destination device through a circuit comprising at least one relay and belonging to a computer network comprising at least one shared memory, the source device comprising one processor configured to implement a communications capability retrieving identifiers of the relays comprised in the circuit and sending a request for generating a proof of use, called a PoU frame, addressed to the destination device, the PoU frame being intended to retrieve, on passage through each of the at least one relay, a signature made from a challenge and a key proper to each of the relays, the PoU frame comprising a value of the challenge used by each of the at least one relay to compute the signatures, a verifying capability configured to authenticate the signatures retrieved in using the public keys of each of the at least one relay of the circuit, the authentication of the signatures by the verifying capability triggering a sending, by the communications capability, of transaction frames addressed to each of the at least one relay identified in the circuit, the transaction frames comprising at least the signatures contained in the PoU frame and triggering, during reception of the transaction frames by each of the at least one relay, a sending of a request for recording a proof of use to a shared memory.

15. A relay device intended to set up a communication between a source device and a destination device through a circuit comprising at least one relay comprising the relay device and belonging to a computer network comprising at least one shared memory, the relay device comprising a processor configured to implement a communications capability receiving, from the source device or from a preceding relay within the circuit, a request for generating a proof of use, called a PoU frame, and a computing resource configured to compute a signature from a challenge and from a key proper to the relay device, the communications capability sending, to the destination device, or from a next relay within the circuit in the direction of the destination device, the PoU frame in adding thereto at least the computed signature and a value of the challenge used by each of the at least one relay to compute the signatures, the communications capability subsequently receiving, from the source device or from the destination device, at least one transaction frame comprising at least the signatures of the at least one relay contained in the PoU frame, the communications capability sending, subsequently to the reception of the at least one transaction, a request for recording, in a shared memory, a proof of use of the relay device comprising at least the signatures of each of the at least one relay of the circuit.

16. A destination device intended to receive a communication from a source device through a circuit comprising at least one relay and belonging to a computer network comprising at least one shared memory, the destination device comprising a processor configured to implement a communications capability receiving a request for generating a proof of use, called a PoU frame, coming from the source device and containing at least one signature made from a challenge and a key proper to each of the at least one relay of the circuit, the PoU frame comprising a value of the challenge used by each of the at least one relay to compute the signatures, a verifying capability configured to authenticate signatures of the PoU frame in using the public keys of the at least one relay of the circuit, the authentication of the signatures by the verifying capability triggering a sending by the communications capability of transaction frames addressed to each of the at least one relay identified in the circuit to generate proofs of use of each of the at least one relay, the transaction frames comprising at least the signatures contained in the PoU frame being designed to trigger the sending by each of the at least one relay of a proof of use recorded in a shared memory.

17. A computer-readable, non-transient recording medium on which there is stored instructions for the implementing of the method of claim 1.

* * * * *